(12) United States Patent
Suzuki

(10) Patent No.: US 11,111,990 B2
(45) Date of Patent: Sep. 7, 2021

(54) BALL SCREW

(71) Applicant: THK CO., LTD., Tokyo (JP)

(72) Inventor: Atsushi Suzuki, Tokyo (JP)

(73) Assignee: THK CO., LTD., Tokyo (JP)

( * ) Notice: Subject to any disclaimer, the term of this patent is extended or adjusted under 35 U.S.C. 154(b) by 95 days.

(21) Appl. No.: 15/114,602

(22) PCT Filed: Jan. 20, 2015

(86) PCT No.: PCT/JP2015/051311
§ 371 (c)(1),
(2) Date: Jul. 27, 2016

(87) PCT Pub. No.: WO2015/115240
PCT Pub. Date: Aug. 6, 2015

(65) Prior Publication Data
US 2016/0341291 A1 Nov. 24, 2016

(30) Foreign Application Priority Data
Jan. 31, 2014 (JP) .............................. JP2014-016305

(51) Int. Cl.
*F16H 25/22* (2006.01)
(52) U.S. Cl.
CPC ................ *F16H 25/2219* (2013.01)
(58) Field of Classification Search
CPC ..................... F16H 25/2219; F16H 2025/2242
See application file for complete search history.

(56) References Cited

U.S. PATENT DOCUMENTS 5,988,007 A * 11/1999 Nishimura .......... F16H 25/2219
74/424.87
8,534,152 B2 * 9/2013 Hsu ..................... F16H 25/2214
74/424.86
(Continued)

FOREIGN PATENT DOCUMENTS

CN 102652232 A 8/2012
CN 103732950 A 4/2014
(Continued)

OTHER PUBLICATIONS

English machine translation of DE 10 2004 043 740 A1, Yabe et al. (Year: 2006).*
(Continued)

*Primary Examiner* — Randell J Krug
(74) *Attorney, Agent, or Firm* — Nixon & Vanderhye

(57) ABSTRACT

A bass screw can move balls smoothly in a return path of a circulating component. The ball screw includes: a screw shaft having a helical ball rolling groove on an outer peripheral surface thereof; a nut having a helical loaded ball rolling groove facing the ball rolling groove, on an inner peripheral surface thereof; a circulating component where at least part of a return path connecting one end and the other end of the loaded ball rolling groove of the nut is formed; and a plurality of balls that can circulate. A contact portion that contacts the ball at two or more points is formed on an outer peripheral side of the return path of the circulating component. The contact portion of the circulating component is twisted in accordance with a change in the direction of a centrifugal force that acts on the ball.

6 Claims, 12 Drawing Sheets

(56) References Cited

U.S. PATENT DOCUMENTS

| | | | |
|---|---|---|---|
| 9,377,093 B2* | 6/2016 | Fujita | F16H 25/2219 |
| 2009/0064811 A1 | 3/2009 | Shirai | |
| 2012/0080257 A1* | 4/2012 | Lee | F16H 25/2219 180/443 |
| 2013/0068052 A1 | 3/2013 | Allegri | |
| 2013/0239725 A1 | 9/2013 | Miyazaki | |
| 2014/0157927 A1 | 6/2014 | Shindo et al. | |
| 2014/0352472 A1* | 12/2014 | Hsieh | F16H 25/2219 74/424.87 |

FOREIGN PATENT DOCUMENTS

| | | | |
|---|---|---|---|
| DE | 102004043740 A1 * | 3/2006 | F16H 25/2214 |
| EP | 2515000 A1 | 10/2012 | |
| JP | 2006-046443 | 2/2006 | |
| JP | 3148532 | 1/2009 | |
| JP | 2009-030809 | 2/2009 | |
| JP | 2010-025301 | 2/2010 | |
| WO | WO 2007/046321 | 4/2007 | |

OTHER PUBLICATIONS

International Search Report, PCT/JP2015/051311, dated Apr. 28, 2015.

Chinese Office Action, dated Apr. 16, 2018, from corresponding CN application No. 20150005321.3, with English Language Translation of cover page.

* cited by examiner

*FIG. 10(a)*     *FIG. 10(b)*
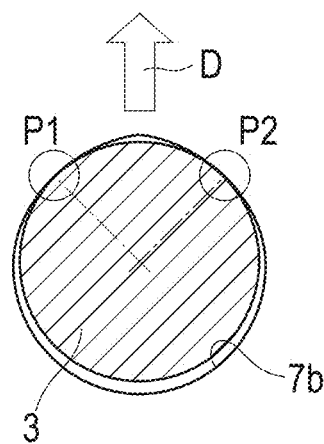
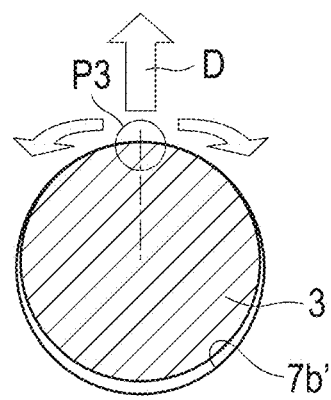

FIG. 12(a)
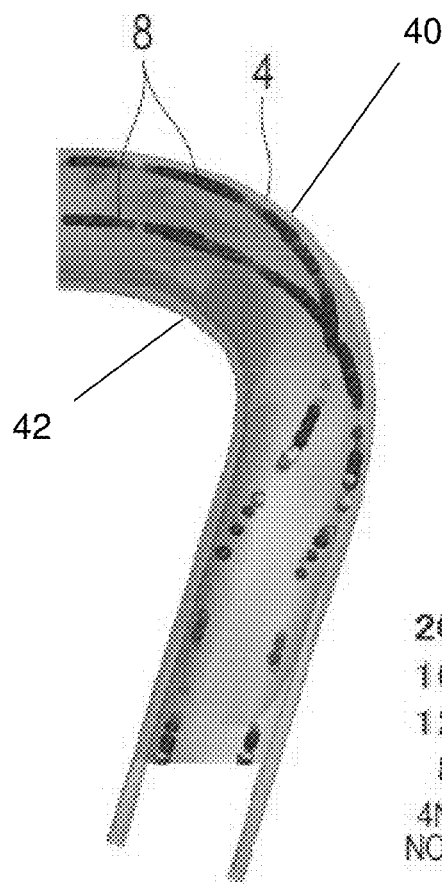
FIG. 12(b)
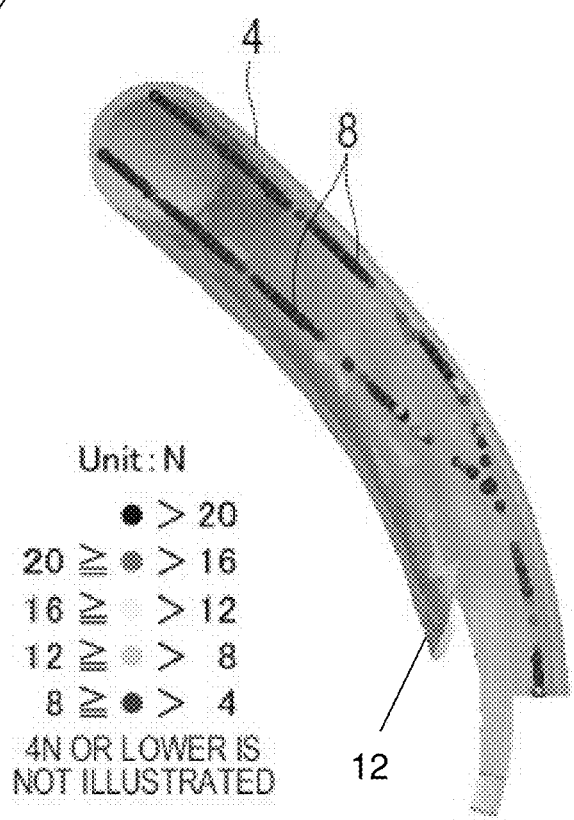
Unit: N
● > 20
20 ≧ ● > 16
16 ≧ ● > 12
12 ≧ ● > 8
8 ≧ ● > 4
4N OR LOWER IS NOT ILLUSTRATED
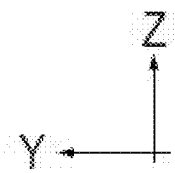
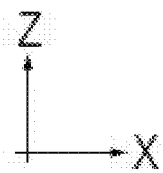

BALL SCREW

TECHNICAL FIELD

The present invention relates to a ball screw where a plurality of balls is rollably interposed between a screw shaft and a nut.

BACKGROUND ART

A ball screw includes a screw shaft, a nut, and a plurality of balls interposed between the screw shaft and the nut. A helical ball rolling groove is formed on an outer peripheral surface of the screw shaft. A helical loaded ball rolling groove facing the ball rolling groove of the screw shaft is formed on an inner peripheral surface of the nut. The plurality of balls is rollably interposed between the ball rolling groove of the screw shaft and the loaded ball rolling groove of the nut. When the screw shaft is rotated relatively to the nut, the balls make rolling motion between them. The rolling motion of the balls makes it possible to obtain light movement. Accordingly, the ball screw is used as a mechanical element that converts rotation motion to linear motion or converts linear motion to rotation motion.

The nut is provided with a circulating component for circulating the balls. An entire return path that connects one end and the other end of the loaded ball rolling groove of the nut, or part of the return path is formed in the circulating component. The circulating components where the entire return path is formed include a return pipe that connects one end and the other end of the loaded ball rolling groove of the nut. The circulating components where part of the return path is formed include an end piece that is placed at an end of a through-hole that is parallel to the axis of the nut. A return path that connects one end of the loaded ball rolling groove of the nut and the through-hole is formed in the end piece.

The return path of a typical circulating component includes a linear portion placed in a tangential direction of the loaded ball rolling groove of the nut, and an arc portion connected to the linear portion to change the travel direction of the balls. When the ball moves along the helical loaded ball rolling groove, the centrifugal force acts on the ball in the radial direction of the nut. When the ball enters the linear portion of the return path of the circulating component from the loaded ball rolling groove, the ball is released from the centrifugal force and moves linearly through the linear portion. The ball moves through the linear portion and then moves through the arc portion to change the travel direction.

CITATION LIST

Patent Literature

Patent Literature 1: JP 2009-30809 A

SUMMARY OF INVENTION

Technical Problem

However, the centrifugal force acts also on the ball that moves through the arc portion of the circulating component. The ball moves along an outer wall of the arc portion under the centrifugal force. A cross-sectional shape of the arc portion of the circulating component is a larger circle than the diameter of the ball. Accordingly, the ball contacts an inner peripheral surface of the arc portion at only one point. Hence, the position of the ball is not determined in the cross section of the arc portion. When the direction of the centrifugal force that acts on the ball changes even slightly, the ball snakes to the left and right with respect to the travel direction. This is one of the causes that the ball does not travel smoothly.

An object of the present invention is to provide a ball screw that can move a ball smoothly in a return path of a circulating component.

Solution to Problem

In order to solve the above problem, according to an aspect of the present invention, a ball screw includes: a screw shaft having a helical ball rolling groove on an outer peripheral surface thereof; a nut having a helical loaded ball rolling groove facing the ball rolling groove, on an inner peripheral surface thereof; a circulating component where at least part of a return path connecting one end and the other end of the loaded ball rolling groove of the nut is formed; and a plurality of balls arranged between the ball rolling groove of the screw shaft and the loaded ball rolling groove of the nut, and in the return path, wherein a contact portion to contact the ball at two or more points is formed on an outer peripheral side of the return path of the circulating component, and the contact portion of the circulating component is twisted in accordance with a change in the direction of a centrifugal force to act on the ball.

Advantageous Effects of Invention

According to the present invention, the ball moves through the curved return path of the circulating component in contact with the contact portion at two or more points. Accordingly, the position of the ball is stabilized in the cross section of the return path, and the balls move through the return path of the circulating component in a state of lining up in order. The contact portion is twisted in accordance with a change in the direction of the centrifugal force that acts on the ball. Accordingly, even if the direction of the centrifugal force changes, the position of the ball stays stable in the cross section of the return path. Hence, the useless movement of the ball is further reduced, and the movement of the ball becomes smooth.

BRIEF DESCRIPTION OF DRAWINGS

FIGS. 10(a) and 10(b) are diagrams illustrating the relationship between the direction of the centrifugal force and positions of a contact portion (FIG. 10(a) illustrates an example of the present invention, and FIG. 10(b) illustrates a comparative example).

FIGS. 12(a) and 12(b) are diagrams illustrating the result of an analysis of a contact force of the ball that acted on the end piece (FIG. 12(a) is a cross-sectional view of the end piece in an X-Z plane, and FIG. 12(b) is a cross-sectional view of the end piece in a Y-Z plane).

DESCRIPTION OF EMBODIMENTS

Figure 1:
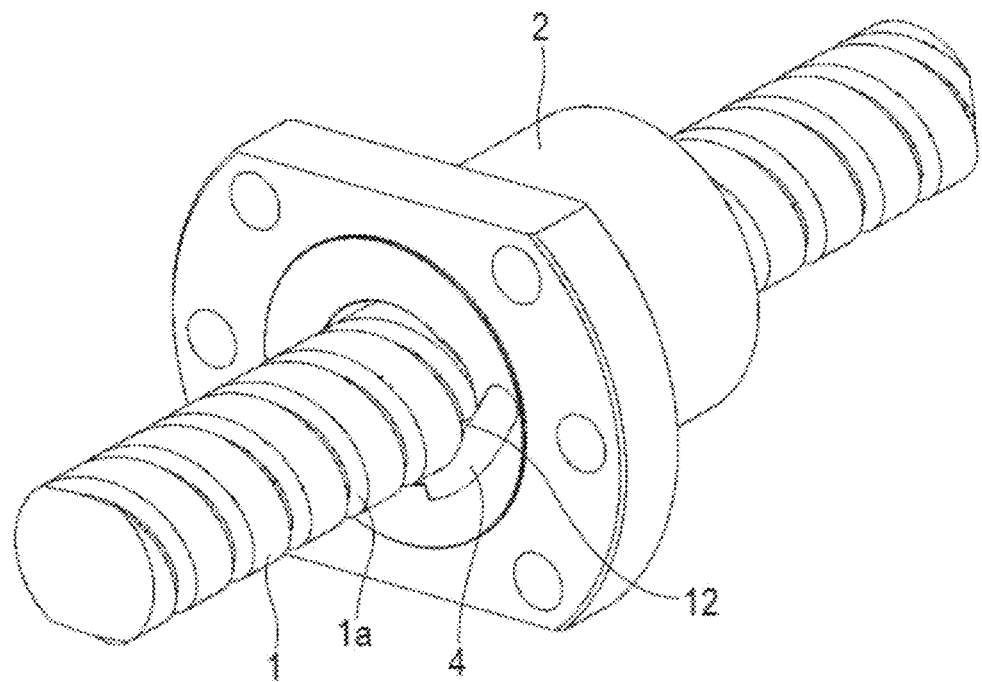
FIG. 1 is an external perspective view of a ball screw according to one embodiment of the present invention.

A ball screw according to one embodiment of the present invention is described in detail hereinafter with reference to the accompanying drawings. FIG. 1 illustrates an external perspective view of the ball screw according to the embodiment. As illustrated in FIG. 1, the ball screw includes a screw shaft 1, and a nut 2 that surrounds the screw shaft 1 and shares the axis with the screw shaft 1.

A helical ball rolling groove 1a having a constant lead is formed on an outer peripheral surface of the screw shaft 1. The cross-sectional shape of the ball rolling groove 1a is a Gothic-arch groove formed by combining two arcs. The radius of the arc of the Gothic-arch groove is larger than the radius of a ball 3 (refer to FIG. 3). The ball 3 contacts the ball rolling groove 1a of the screw shaft 1 at two points. The number of threads of the ball rolling groove 1a can be set to, for example, one, two, or three, as appropriate.

Figure 2A:
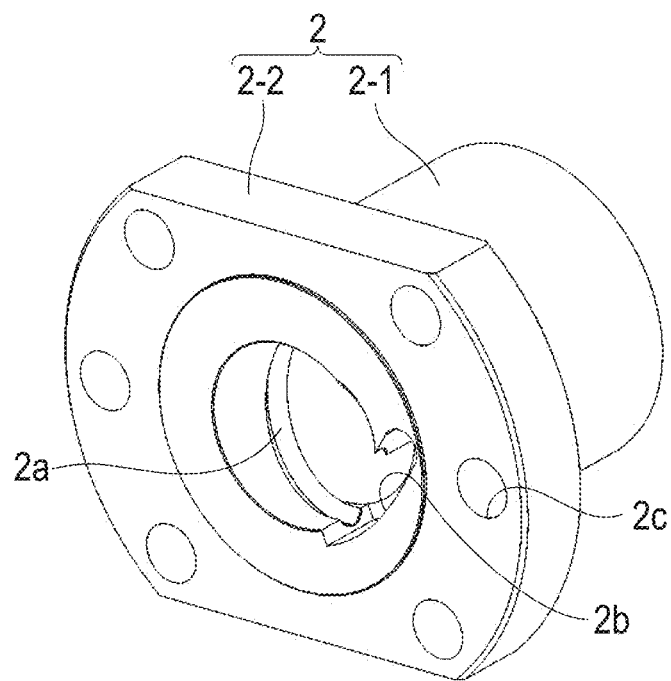
FIG. 2(a) is an external perspective view of a nut.
Figure 2B:
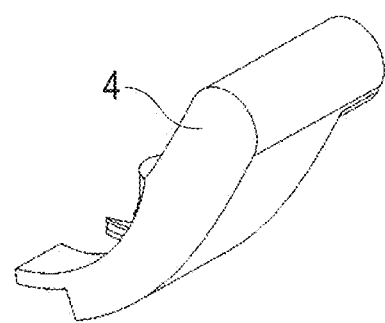
FIG. 2(b) is an external perspective view of an end piece that is attached to the nut.

FIG. 2(a) illustrates an external perspective view of the nut 2 that has been removed from the screw shaft 1. The nut 2 includes a cylindrical main portion 2-1 and a flange 2-2 provided at one end of the main portion 2-1 in the axial direction. A mounting hole 2c for mounting the nut 2 to a counterpart component is open into the flange 2-2. A helical loaded ball rolling groove 2a that faces the ball rolling groove 1a of the screw shaft 1 is formed on an inner peripheral surface of the nut 2. The lead and number of threads of the loaded ball rolling groove 2a are equal to the lead and number of threads of the ball rolling groove 1a. The cross-sectional shape of the loaded ball rolling groove 2a is also a Gothic-arch groove formed by combining two arcs.

As illustrated in FIG. 1, a pair of end pieces 4 as circulating components for circulating the balls 3 is attached to both ends of the nut 2 in the axial direction. FIG. 1 illustrates only the end piece 4 at the front of the nut 2. However, the end piece 4 is provided also at the back of the nut 2. As illustrated in FIG. 2(a), an attachment hollow 2b for attaching the end piece 4 is open into an end surface of the nut 2 in the axial direction. The end piece 4 is fit into the attachment hollow 2b of the nut 2.

Figure 3:
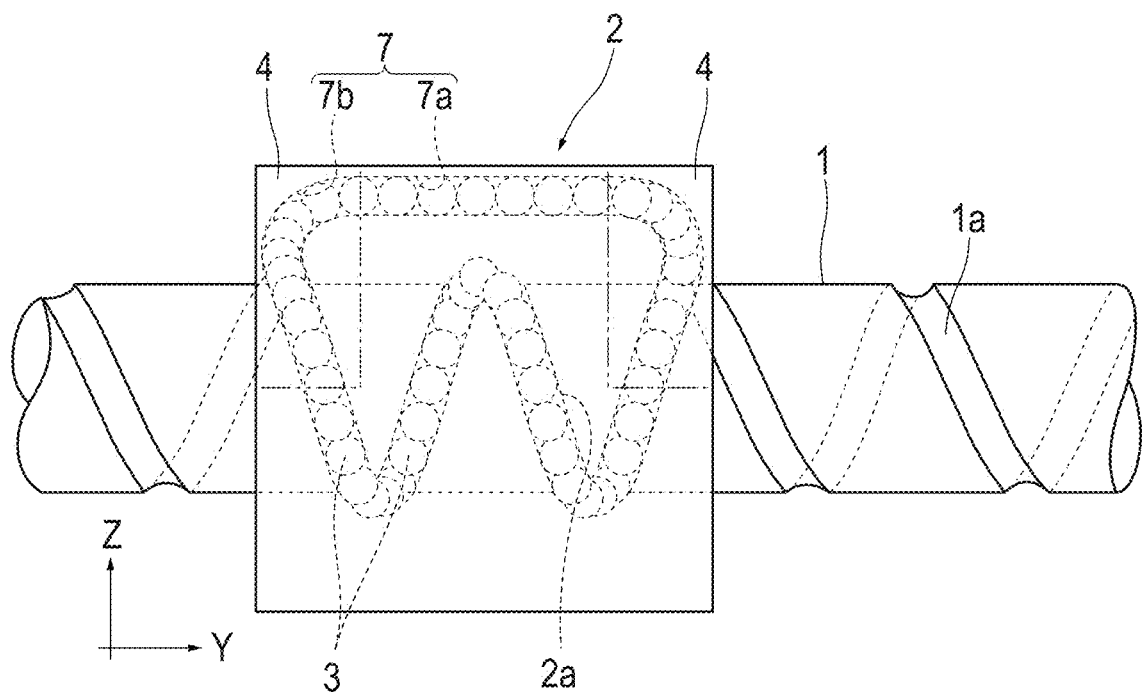
FIG. 3 is a side view of the ball screw.

FIG. 3 illustrates a schematic diagram of a circulation path of the ball screw. FIG. 3 illustrates the nut 2 from which the flange 2-2 has been removed. A plurality of the balls 3 is arranged between the ball rolling groove 1a of the screw shaft 1 and the loaded ball rolling groove 2a of the nut 2. A loaded ball rolling path is formed between the ball rolling groove 1a of the screw shaft 1 and the loaded ball rolling groove 2a of the nut 2. In the loaded ball rolling path, the ball 3 rolls receiving a load between the nut 2 and the screw shaft 1.

A return path 7 that connects one end and the other end of the loaded ball rolling groove 2a is formed in the nut 2. The plurality of balls 3 is arranged also in the return path 7. A through-hole 7a that is parallel to the axis of the nut 2 is formed in the nut 2. The end pieces 4 are placed at both ends of the through-hole 7a of the nut 2. The return path 7 includes the through-hole 7a of the nut 2 and deflecting sections 7b of the end pieces 4. The ball 3 that has rolled to one end of the loaded ball rolling groove 2a enters the return path 7, and returns to the other end of the loaded ball rolling groove 2a via the return path 7. The ball 3 then rolls to the one end of the loaded ball rolling groove 2a again. The inner diameter of the return path 7 is larger than the diameter of the ball 3. The ball 3 is released from the load in the return path 7.

Figure 4:
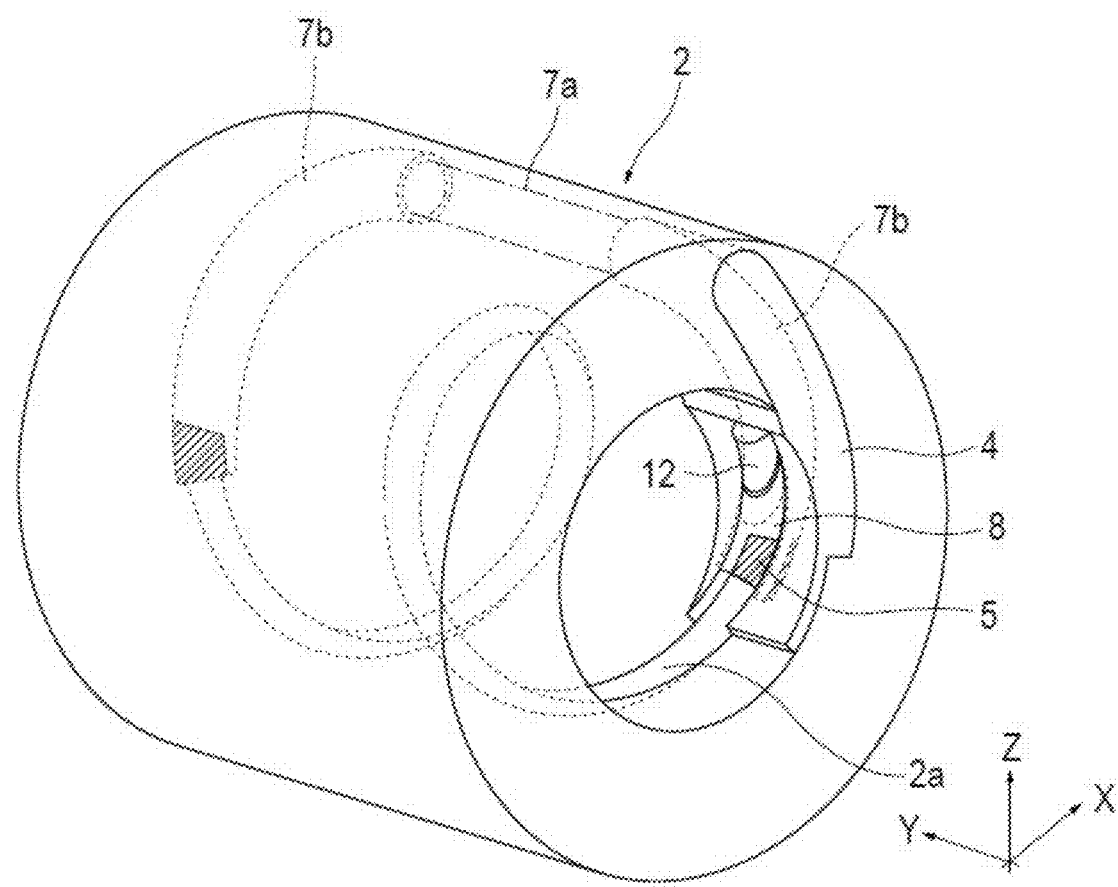
FIG. 4 is a perspective view of the nut to which the end pieces are attached.

FIG. 4 illustrates a perspective view of the nut 2 to which the end pieces 4 are attached. In FIG. 4, the deflecting sections 7b of the end pieces 4 and the loaded ball rolling groove 2a are indicated by dotted lines, and the through-hole 7a by dot-and-dash lines. As described above, the deflecting section 7b of the end piece 4 connects one end of the loaded ball rolling groove 2a of the nut 2 and the through-hole 7a. The center line of the deflecting section 7b of the end piece 4 is formed into a curve over the entire length of the deflecting section 7b in such a manner as to cause the centrifugal force to act on the ball 3 moving through the deflecting section 7b. The shape of the center line of the deflecting section 7b of the end piece 4 will be described hereinafter. A crowning 5 illustrated as a hatched portion in FIG. 4 is formed at one end of the loaded ball rolling groove 2a of the nut 2. A contact portion 8 formed of a Gothic-arch groove, which will be described below, is formed on an outer peripheral side of the deflecting section 7b of the end piece 4. The Gothic-arch groove of the contact portion 8 is deeper than the Gothic-arch groove of the loaded ball rolling groove 2a of the nut 2. The crowning 5 includes an inclined surface, and prevents the generation of a level difference between the loaded ball rolling groove 2a of the nut 2 and the contact portion 8 of the end piece 4.

Figure 5:
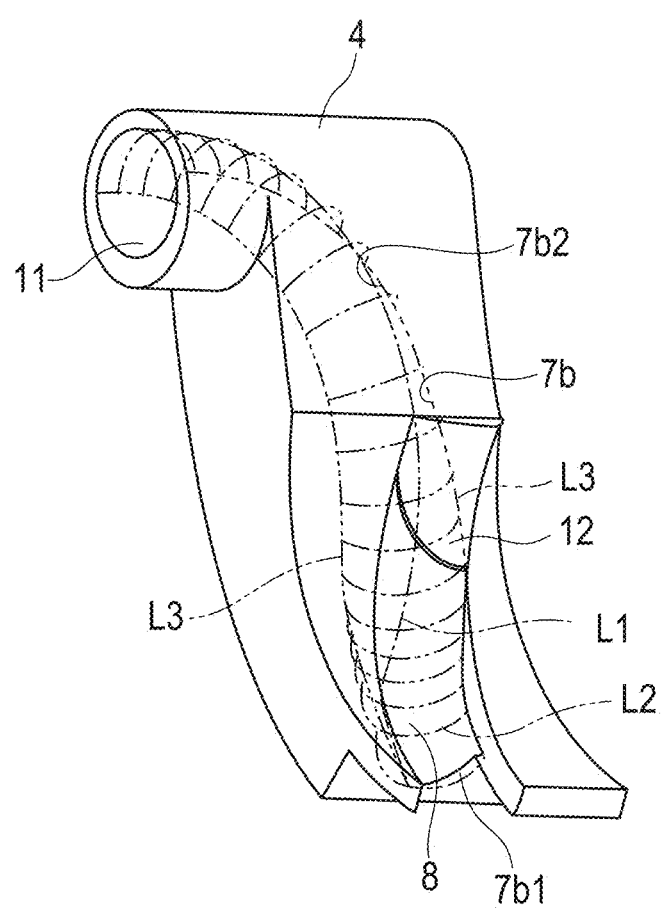
FIG. 5 is an external perspective view of the end piece.

FIG. 5 illustrates a detailed diagram of the end piece 4. The center line of the deflecting section 7b of the end piece 4 is a curve that causes the centrifugal force to act on the ball 3. Long dashed triplicate-dotted lines L3 in FIG. 5 indicate boundaries between the outer peripheral side and an inner peripheral side of the deflecting section 7b. The centrifugal force oriented toward the outer peripheral side of the deflecting section 7b acts on the ball 3 that moves through the deflecting section 7b. The outer peripheral side of the deflecting section 7b needs to contact the ball 3 at two or more points to stabilize the position of the ball 3 that receives the centrifugal force. Hence, the contact portion 8 that contacts the ball 3 at two points is formed on the outer peripheral side of the deflecting section 7b. The cross-sectional shape of the contact portion 8 is a Gothic-arch groove including two arcs. The radius of the arc of the Gothic-arch groove is larger than the radius of the ball 3. In FIG. 5, the shape of the contact portion 8 that is cut at regular intervals in the travel direction of the ball 3 is indicated by chain double-dashed lines L2. A dot-and-dash line L1 in FIG. 5 is a line connecting the bottom of the contact portion 8.

The centrifugal force that acts on the ball 3 that moves through the deflecting section 7b of the end piece 4 changes with changes in the position of the ball 3 in the travel direction. Changes in the direction of the centrifugal force are described below. The centrifugal force acts in the radial direction of the nut 2 at an end portion 7b1 of the deflecting section 7b connected to the loaded ball rolling groove 2a of the nut 2, as in the loaded ball rolling groove 2a. The bottom of the contact portion 8 is continuous to the bottom of the loaded ball rolling groove 2a. As illustrated in FIG. 8(*a*), the centrifugal force acts in a radial direction (1) of the nut 2 at the end portion of the deflecting section 7b as viewed from the axial direction of the nut 2.

On the other hand, an arc portion 7b2 whose center line is formed of a single arc is formed in the middle of the deflecting section 7b of the end piece 4 to change the direction of the ball 3. The arc portion 7b2 will be described hereinafter. As illustrated in FIG. 8(*b*), the centrifugal force acts on the ball 3 in a radial direction (2) of the arc portion 7b2 in the arc portion 7b2 of the deflecting section 7b as viewed from the side of the nut 2. The direction (1) of the centrifugal force is different from the direction (2) of the centrifugal force. Even if the direction of the centrifugal force changes in accordance with changes in the position of the ball 3 in the travel direction, the contact portion 8 is twisted around the center line of the deflecting section 7b, in accordance with changes in the direction of the centrifugal force that acts on the ball 3 to stabilize the position of the ball 3. The deflecting section 7b of the end piece 4 is twisted between the arc portion 7b2 and the end portion 7b1. As illustrated in FIG. 5, the line L1 connecting the bottom of the contact portion 8 is also twisted approximately 90 to 110 degrees in accordance with the twist of the contact portion 8.

As illustrated in FIG. 5, the cross-sectional shape of an inner peripheral side 11 of the deflecting section 7b of the end piece 4 is formed into a semicircle. A scooping portion 12 that scoops the balls 3 rolling along the loaded ball rolling groove 2a of the nut 2 into the deflecting section 7b is formed at an end portion of the inner peripheral side 11 of the deflecting section 7b. The ball 3 moves in contact with the contact portion 8 on the outer peripheral side of the deflecting section 7b, which indicates that the ball 3 is not leaded into the deflecting section 7b by coming into contact with the scooping portion 12 on the inner peripheral side 11 of the deflecting section 7b. The scooping portion 12 is provided to make sure that even the ball 3 that deviates from the circulation raceway or travels at low speed is leaded into the deflecting section 7b. The radius of the semicircle on the inner peripheral side 11 of the deflecting section 7b is equal to the radius of the through-hole 7a.

Figure 6:
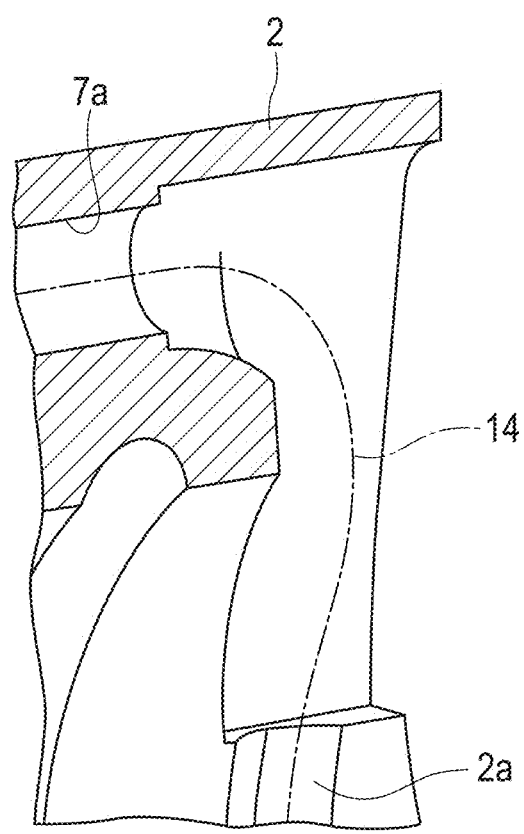
FIG. 6 is a cross-sectional view taken along a through-hole of the nut.
Figure 7:
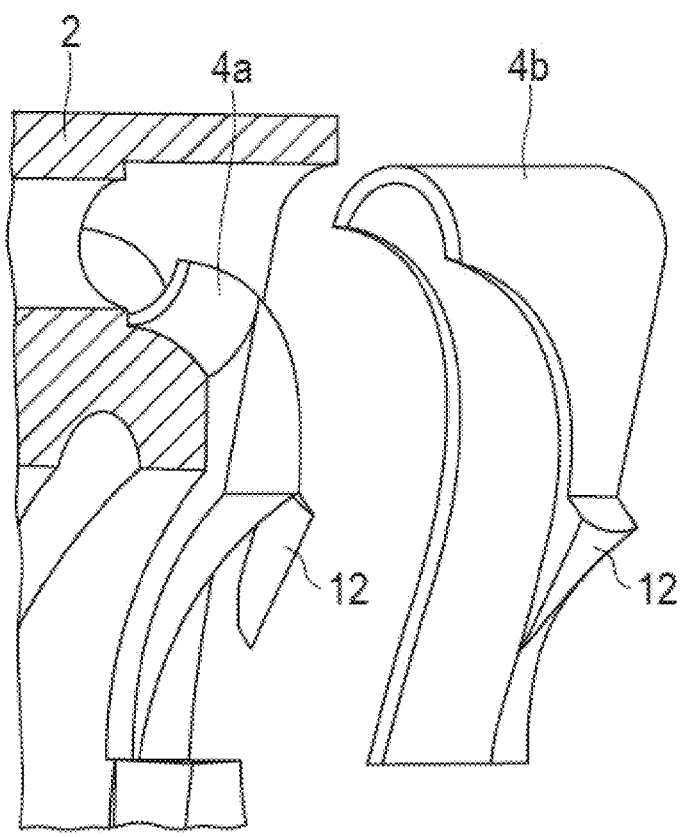
FIG. 7 is an exploded perspective view of the end piece.

FIG. 6 illustrates a cross-sectional view taken along the through-hole 7a of the nut 2. A dot-and-dash line in FIG. 6 indicates a center line 14 of the deflecting section 7b of the end piece 4. The center line 14 of the deflecting section 7b is connected at one end (a lower end in FIG. 6) to the center line of the loaded ball rolling groove 2a and connected at the other end (an upper end in FIG. 6) to the center line of the through-hole 7a. FIG. 7 illustrates an exploded perspective view of the end piece 4 that is attached to the nut 2. The end piece 4 is divided into two of an inner side 4a and an outer side 4b to facilitate manufacture. The divided surfaces are different from the boundaries L3 between the inner peripheral side and the outer peripheral side of the deflecting section 7b indicated by the long dashed triplicate-dotted lines in FIG. 5. In the embodiment, the boundaries L3 are not on the divided surfaces, but may be configured to be on the divided surfaces.

FIGS. 8(*a*) and 8(*b*) illustrate the center line 14 of the deflecting section 7b of the end piece 4. FIG. 8(*a*) illustrates the center line 14 of the deflecting section 7b as viewed from the axial direction of the nut 2. FIG. 8(*b*) illustrates the center line 14 of the deflecting section 7b as viewed from the side of the nut 2. As described above, the deflecting section 7b connects the loaded ball rolling groove 2a of the nut 2 and the through-hole 7a of the nut 2. As illustrated in FIG. 8(*a*), the curvature of the center line 14 near the end portion 7b1 of the deflecting section 7b agrees with the curvature of the loaded ball rolling groove 2a of the nut 2 as viewed from the axial direction of the nut 2. The radius of curvature of the loaded ball rolling groove 2a of the nut 2 is half the BCD (Ball Circle Diameter). The curvature is the inverse of the radius of curvature. The curvature of the center line 14 of the deflecting section 7b is gradually reduced with increasing distance from the loaded ball rolling groove 2a. In the embodiment, the curvature is continuously reduced. A clothoid curve, a spline curve, or the like can be used as the curve whose curvature changes continuously.

The center line 14 of the deflecting section 7b of the end piece 4 is configured in this manner. Accordingly, the continuity of the centrifugal force between the loaded ball rolling groove 2a of the nut 2 and the deflecting section 7b can be maintained, and also the centrifugal force in the radial direction of the nut 2 can be progressively reduced toward the through-hole 7a. The ball 3 moves along the linear raceway in the through-hole 7a. Accordingly, the centrifugal force does not act on the ball 3. The centrifugal force is progressively reduced toward the through-hole 7a to also enable assurance of the continuity of the centrifugal force to the linear raceway of the through-hole 7a of the nut 2.

As illustrated in FIG. 8(*b*), as viewed from the side of the nut 2, the deflecting section 7b of the end piece 4 includes the arc portion 7b2 where the center line 14 is formed of an arc, the end portion 7b1 connected to the loaded ball rolling groove 2a of the nut 2, a first curve portion 7b3 that connects the arc portion 7b2 and the end portion 7b1, and a second curve portion 7b4 that connects the arc portion 7b2 and the through-hole 7a.

In the arc portion 7b2, the center line 14 is formed of a single arc. The arc portion 7b2 plays a role in changing the direction of the ball 3. The segment of the arc portion 7b2 is indicated by an angle $\theta$ in FIG. 8(*b*).

As illustrated in FIG. 8(*b*), the center line 14 is inclined in accordance with the lead of the loaded ball rolling groove 2a of the nut 2 in the end portion 7b1, as viewed from the side of the nut 2. When the axis of the nut 2 is placed in the horizontal direction (X axis), an inclined angle $\theta 1$ of the end portion 7b1 with respect to the vertical direction (Z axis) is equal to the lead angle of the loaded ball rolling groove 2a of the nut 2.

As illustrated in FIG. 8(*b*), the first curve portion 7b3 connects the end portion 7b1 and the arc portion 7b2 such that the tangential direction and curvature of the center line 14 are continuous as viewed from the side of the nut 2. The curvature of the first curve portion 7b3 is zero at the part connected to the end portion 7b1, and is equal to the curvature of the arc portion 7b2 at the part connected to the arc portion 7b2.

As illustrated in FIG. 8(*b*), the second curve portion 7b4 connects the arc portion 7b2 and the through-hole 7a such that the tangential direction and curvature of the center line 14 are continuous as viewed from the side of the nut 2. The curvature of the second curve portion 7b4 is equal to the curvature of the arc portion 7b2 at the part connected to the arc portion 7b2, and is zero at the part connected to the through-hole 7a. Curves where a curvature is continuous such as a clothoid curve and a spline curve can be used for the first and second curve portions 7b3 and 7b4.

Figure 8A:
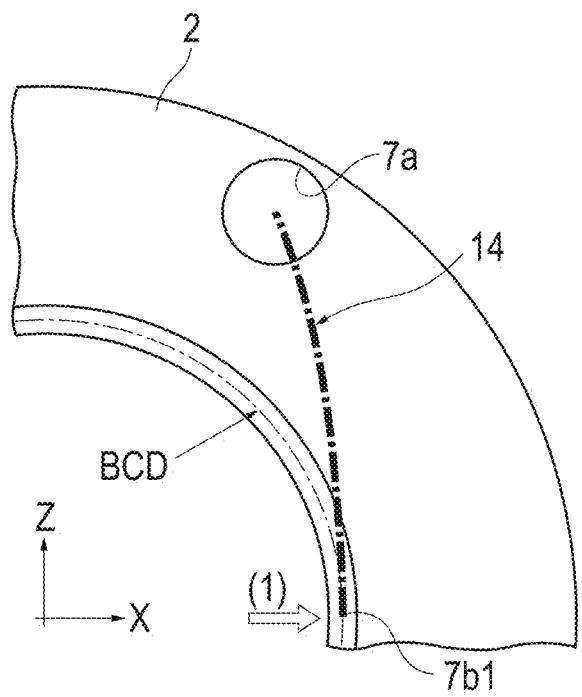
FIGS. 8(a) and 8(b) illustrate the center line of a deflecting section of the end piece (FIG. 8(a) illustrates the center line of the deflecting section as viewed from the axial direction of the nut, and FIG. 8(b) illustrates the center line of the deflecting section as viewed from the side of the nut).
Figure 8B:
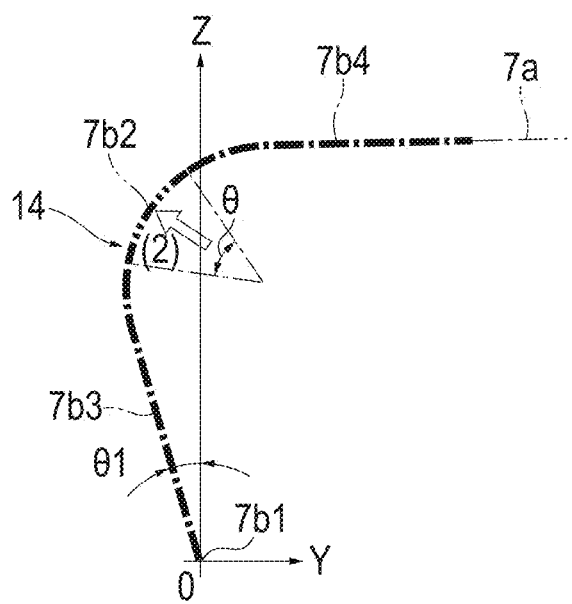

The center line 14 of the deflecting section 7b of the end piece 4 is a three-dimensional curve formed by combining the two-dimensional curve illustrated in FIG. 8(a) and the two-dimensional curve illustrated in FIG. 8(b). When the continuity of the curvature is maintained in the two-dimensional curves illustrated in FIGS. 8(a) and 8(b), the continuity of the curvature is maintained also in the three-dimensional curve. The continuity of the curvature is maintained to enable the prevention of the occurrence of a sudden change in centrifugal force.

Figure 9:
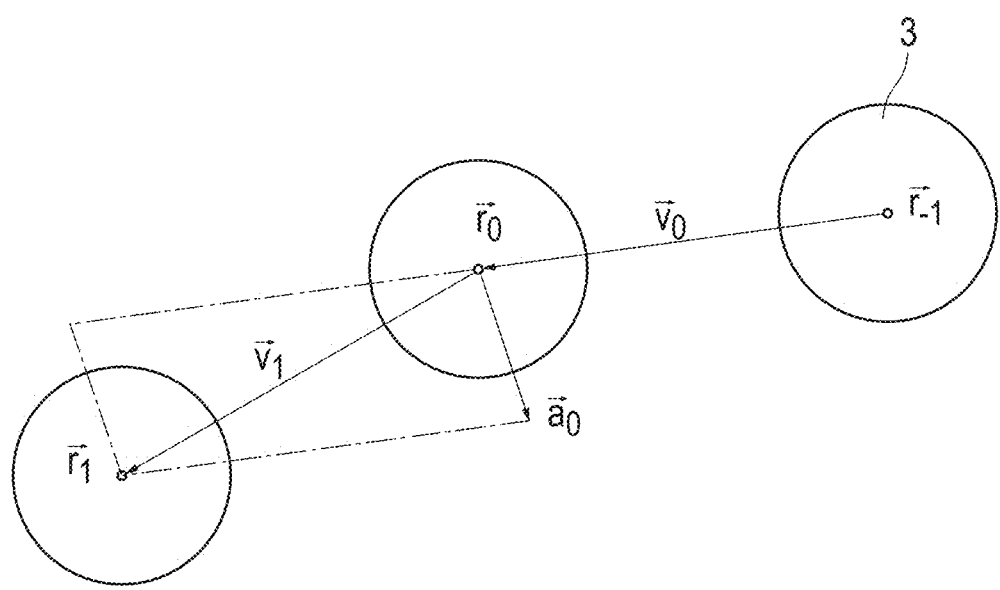
FIG. 9 is a schematic diagram illustrating a method of calculating the centrifugal force.

The method of calculating the direction of the centrifugal force that acts on the ball 3 is as follows: if the center line 14 of the deflecting section 7b of the end piece 4 is expressed mathematically, the direction of the centrifugal force can be obtained by a second derivative. As illustrated in FIG. 9, even if the center line 14 of the deflecting section 7b is expressed only as coordinates, the direction of the centrifugal force can be obtained from the coordinates of the center line 14 of the deflecting section 7b as indicated in Math. 1. The contact portion 8 having a bottom in the direction of the centrifugal force is produced after the direction of the centrifugal force that acts on the ball 3 is obtained.

$$\vec{v}_1 = \vec{r}_1 - \vec{r}_0$$

$$\vec{v}_0 = \vec{r}_0 - \vec{r}_{-1}$$

$$\vec{a}_0 = \vec{v}_1 - \vec{v}_0 \qquad \text{[Math. 1]}$$

r is a position vector. v is a velocity vector. a is an acceleration vector. The subscripts, −1, 0, and 1, indicate positions.

FIG. 10(a) illustrates a cross-sectional view of the deflecting section 7b of the end piece 4. Two or more contact points are required to stabilize the position of the ball 3 that receives the centrifugal force. In the example illustrated in FIG. 10(a), the cross-sectional shape of the contact portion 8 is made into a Gothic-arch groove so that the contact portion 8 contacts the ball 3 at two points P1 and P2. The contact points between the contact portion 8 and the ball 3 are placed bilaterally symmetrically about a direction D of the centrifugal force that acts on the ball 3.

FIG. 10(b) illustrates, as a comparative example, a cross section of a deflecting section 7b' of a known end piece that contacts the ball 3 at one point. If an inner peripheral surface of the deflecting section 7b' contacts the ball 3 at one point P3, when the direction D of the centrifugal force changes, the ball 3 deviates to the left and right, so that its position becomes unstable.

Figure 11A:
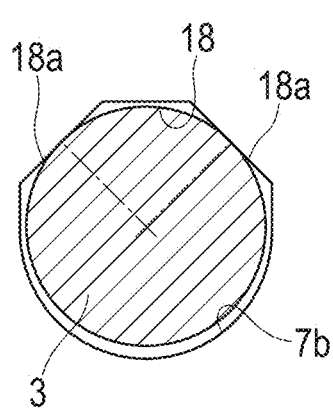
FIGS. 11(a) to 11(c) are diagrams illustrating other examples of the contact portion (FIG. 11(a) illustrates an example where the contact portion includes three straight lines, FIG. 11(b) illustrates an example where the contact portion includes five straight lines, and FIG. 11(c) illustrates an example where the contact portion includes three protrusions).
Figure 11B:
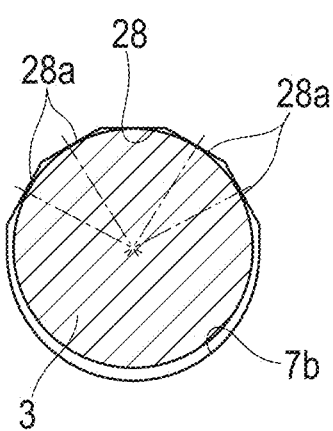
Figure 11C:
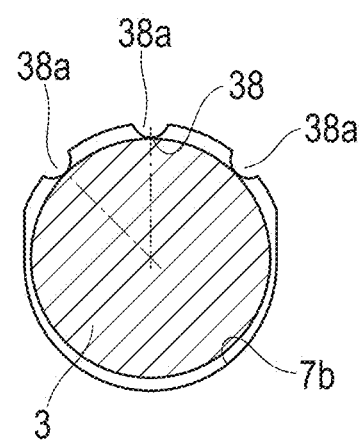

FIGS. 11(a), 11(b), and 11(c) illustrate other examples of the cross-sectional shape of the deflecting section 7b of the end piece 4. FIG. 11(a) illustrates an example where a contact portion 18 includes three straight lines. Two straight lines 18a on both sides contact the ball 3. FIG. 11(b) illustrates an example where a contact portion 28 includes five straight lines. Four straight lines 28a excluding the central straight line contact the ball 3. The contact portion 28 contacts the ball 3 at four points. FIG. 11(c) illustrates an example where a contact portion 38 includes three protrusions 38a. The contact portion 38 contacts the ball 3 at three points. In this manner, the number of contact points between the contact portions 8, 18, 28, and 38 and the ball 3 can be any number as long as it is two or more. The cross-sectional shapes of the contact portions 8, 18, 28, and 38 can also be any combination of arcs, straight lines, protrusions, and the like.

Up to this point the configuration of the ball screw according to the embodiment has been described in detail. The ball screw according to the embodiment has the following effects.

The ball 3 moves through the curved deflecting section 7b of the end piece 4, in contact with the contact portion 8 at two points. Accordingly, the position of the ball 3 is stabilized in the cross section of the deflecting section 7b. The balls 3 move through the deflecting section 7b of the end piece 4 in the state of lining up in order. The contact portion 8 is twisted in accordance with changes in the direction of the centrifugal force that acts on the ball 3. Accordingly, even if the direction of the centrifugal force changes, the position of the ball 3 in the cross section of the deflecting section 7b stays stable. Hence, the useless movement of the ball 3 is further reduced to make the movement of the ball 3 smooth.

The contact portion 8 of the end piece 4 is twisted between the arc portion 7b2 and the end portion 7b1. Accordingly, even if the direction of the centrifugal force changes between the arc portion 7b2 that changes the direction of the ball 3 and the end portion 7b1 that is connected to the loaded ball rolling groove 2a, the position of the ball 3 is stable.

As viewed from the axial direction of the nut 2, the center line 14 of the deflecting section 7b of the end piece 4 is formed into a curve whose curvature is gradually reduced with increasing distance from the loaded ball rolling groove 2a of the nut 2. Accordingly, it is possible to cause the centrifugal force to act on the ball 3 immediately after entering the deflecting section 7b of the end piece 4 from the loaded ball rolling groove 2a of the nut 2. The position of the ball 3 is stable immediately after entering the deflecting section 7b of the end piece 4. The curvature of the center line 14 of the deflecting section 7b is progressively reduced toward the through-hole 7a. Accordingly, it is also possible to ensure the continuity of the centrifugal force to the linear raceway of the through-hole 7a. Furthermore, the ball 3 moves in contact with the outer peripheral side of the deflecting section 7b of the end piece 4. Accordingly, the contact between the scooping portion 12 on the inner peripheral side of the deflecting section 7b and the ball 3 is reduced, so that the life of the scooping portion 12 is improved.

As viewed from the side of the nut 2, the deflecting section 7b of the end piece 4 includes the arc portion 7b2, the end portion 7b1 that is connected to the loaded ball rolling groove 2a of the nut 2, the first curve portion 7b3 that connects the arc portion 7b2 and the end portion 7b1 such that the curvature of the center line 14 is continuous, and the second curve portion 7b4 that connects the arc portion 7b2 and the through-hole 7a such that the curvature of the center line 14 is continuous. Accordingly, the continuity of the centrifugal force in the deflecting section 7b can be ensured.

As viewed in the cross section of the deflecting section 7b of the end piece 4, the contact points of the contact portions 8, 18, 28, and 38 of the end piece 4 with the ball 3 are placed bilaterally symmetrically with respect to the direction of the centrifugal force that acts on the ball 3. Accordingly, the reaction force in an opposite direction to the direction of the centrifugal force can be caused to act on the ball 3, so that the position of the ball 3 can be stabilized.

EXAMPLE 1

An analysis was made of a contact force with the ball 3, which was generated on the end piece 4 when the load was axially applied to the nut 2 of the ball screw illustrated in FIG. 1, and the screw shaft 1 was rotated. FIGS. 12(a) and 12(b) illustrate the result of the analysis. FIG. 12(a) is a cross-sectional view of the end piece 4 in an X-Z plane. FIG. 12(b) is a cross-sectional view of the end piece 4 in a Y-Z plane. A portion plotted with • in the drawings is the contact portion 8 where the ball 3 contacts the deflecting section 7b. The ball 3 contacted only the contact portion 8 on the outer peripheral side 40 of the deflecting section 7b and hardly contacted the scooping portion 12 on the inner peripheral side 42 of the deflecting section 7b. The contact forces between the ball 3 and the contact portion 8 also generally had stable small values, and were not increased partially and suddenly. The portion plotted with • is twisted, which shows that the contact portion 8 is twisted.

The present invention is not limited to a realization of the above embodiment, and can be realized in various embodiments within the scope that does not change the gist of the present invention.

In the above embodiment, the circulating component is described, taking, as an example, the end piece where part of the return path is formed. However, a return pipe where the entire return path is formed can also be used as the circulating component.

In the above embodiment, the center line of the deflecting section of the end piece is formed over the entire length into a curve that causes the centrifugal force to act on the ball. However, part of the center line of the deflecting section of the end piece can also be formed into a straight line.

In the above embodiment, the three-dimensional curve is formed by combining the two-dimensional curve illustrated in FIG. 8(a) and the two-dimensional curve illustrated in FIG. 8(b). However, it is also possible to form a three-dimensional curve by plotting three-dimensional positions, and interpolating the plotted points with a three-dimensional spline curve (that is, a spline curve such as a NURBS curve where a curvature is continuous) or a three-dimensional clothoid curve.

In the above embodiment, the cross-section on the inner peripheral side of the deflecting section of the end piece is formed into a semicircle, but can also be formed into a Gothic-arch groove.

In the above embodiment, the cross-sectional shape of the ball rolling groove of the screw shaft and the loaded ball rolling groove of the nut is formed into a Gothic-arch groove including two arcs, but can also be formed into a circular arc groove including a single arc.

The present description is based on Japanese Patent Application No. 2014-016305 filed on Jan. 31, 2014, the entire content of which is incorporated herein by reference.

REFERENCE SIGNS LIST

Ball screw
1a Ball rolling groove
2 Nut
2a Loaded ball rolling groove
3 Ball
4 End piece (circulating component)
7 Return path
7a Through-hole
7b Deflecting section (return path) of the end piece
7b1 End portion
7b2 Arc portion
7b3 First curve portion
7b4 Second curve portion
8, 18, 28, 38 Contact portion
14 Center line of the return path

The invention claimed is:

1. A ball screw comprising:
a screw shaft having a helical ball rolling groove on an outer peripheral surface thereof;
a nut having a helical loaded ball rolling groove facing the ball rolling groove of the screw shaft, on an inner peripheral surface thereof, a cavity being provided on an axial end of the nut;
a circulating component where at least part of a return path connecting one end and the other end of the loaded ball rolling groove of the nut is formed, the circulating component being inserted along an axial face of the nut in the cavity of the nut; and
a scooping portion extending radially inwards from the return path of the circulating component, the scooping portion being configured to scoop a deviating ball that deviates from a circulation raceway and that does not contact a contact portion on the outer peripheral side of the return path, the deviating ball rolling between the ball rolling groove of the screw shaft and the loaded ball rolling groove of the nut into the return path,
wherein the contact portion whose cross-sectional shape is a Gothic-arch groove is configured to contact at least one non-deviating ball, the contact portion being formed on an outer peripheral side of the return path of the circulating component opposite to the scooping portion, the contact portion being configured to contact the at least one non-deviating ball at two contact points, in a cross-sectional view perpendicular to the return path, and the scooping portion is configured to scoop the deviating ball into the return path,
a line connecting to a bottom of the contact portion of the circulating component is twisted around a center line of the return path in accordance with a change in the direction of a centrifugal force to act on the non-deviating ball so that the bottom of the contact portion is in the direction of the centrifugal force,
the bottom of an end portion of the contact portion of the circulating component is continuous to a bottom of the loaded ball rolling groove of the nut, and
a curvature of an end portion of the center line of the return path of the circulating component is substantially the same as a curvature of the loaded ball rolling groove of the nut, and the center line of the return path of the circulating component is a curve having a curvature that is gradually reduced with increasing distance from the loaded ball rolling groove of the nut, as viewed from the axial direction of the nut.

2. The ball screw according to claim 1, wherein the return path of the circulating component includes:
an arc portion having an arc-shaped center line, and
the end portion connected to the loaded ball rolling groove of the nut, and
the contact portion of the circulating component is twisted between the arc portion and the end portion.

3. The ball screw according to claim 2, wherein, as viewed in a cross section of the return path of the circulating component, the contact points of the contact portion of the circulating component that contact with the at least one non-deviating ball are placed bilaterally symmetrically with respect to the direction of the centrifugal force to act on the at least one non-deviating ball.

4. The ball screw according to claim 1, wherein, as viewed from a side of the nut, the return path of the circulating component includes:
- an arc portion having an arc-shaped center line,
- the end portion connected to the loaded ball rolling groove of the nut, the end portion having a center line inclined in accordance with a lead of the loaded ball rolling groove of the nut,
- a first curve portion connecting the arc portion and the end portion such that the curvature of the center line is continuous, and
- a second curve portion connecting an arc portion and a through-hole such that the curvature of the center line is continuous.

5. The ball screw according to claim 1, wherein, as viewed in a cross section of the return path of the circulating component, the contact points of the contact portion of the circulating component that contact with the at least one non-deviating ball are placed bilaterally symmetrically with respect to the direction of the centrifugal force to act on the at least one non-deviating ball.

6. The ball screw according to claim 1, wherein the bottom of the end portion of the contact portion of the circulating component is continuous to the bottom of the loaded ball rolling groove of the nut along an internal circumferential direction of the nut.

* * * * *